Oct. 12, 1965

F. F. FLOWERS 3,211,468

VEHICLE SUSPENSION MECHANISM

Filed July 18, 1962

INVENTOR

F. F. Flowers

BY Mason, Porter, Diller & Stewart

ATTORNEYS

Oct. 12, 1965  F. F. FLOWERS  3,211,468
VEHICLE SUSPENSION MECHANISM
Filed July 18, 1962  3 Sheets-Sheet 2
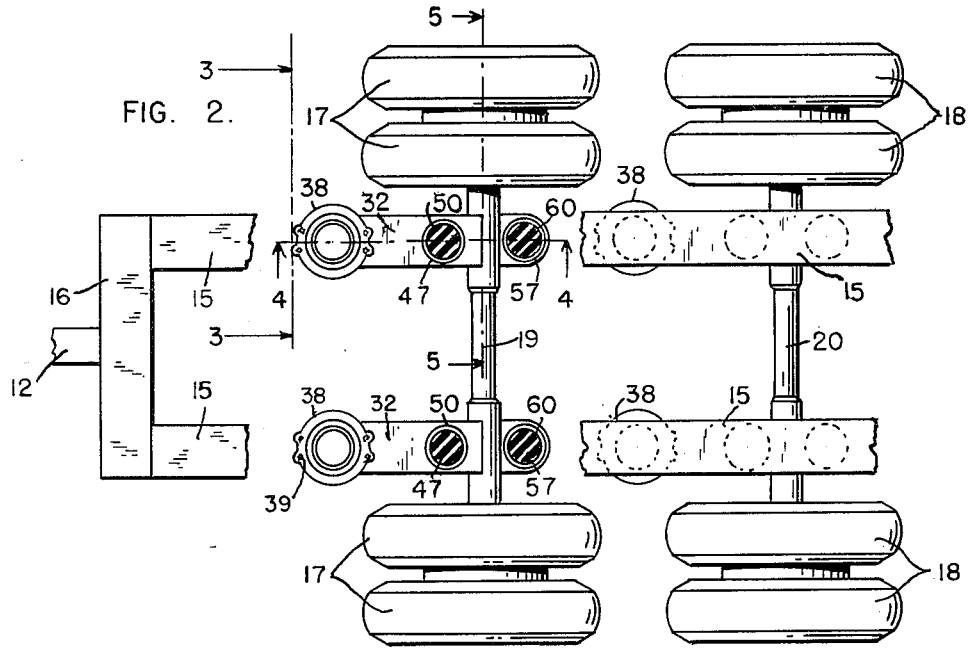
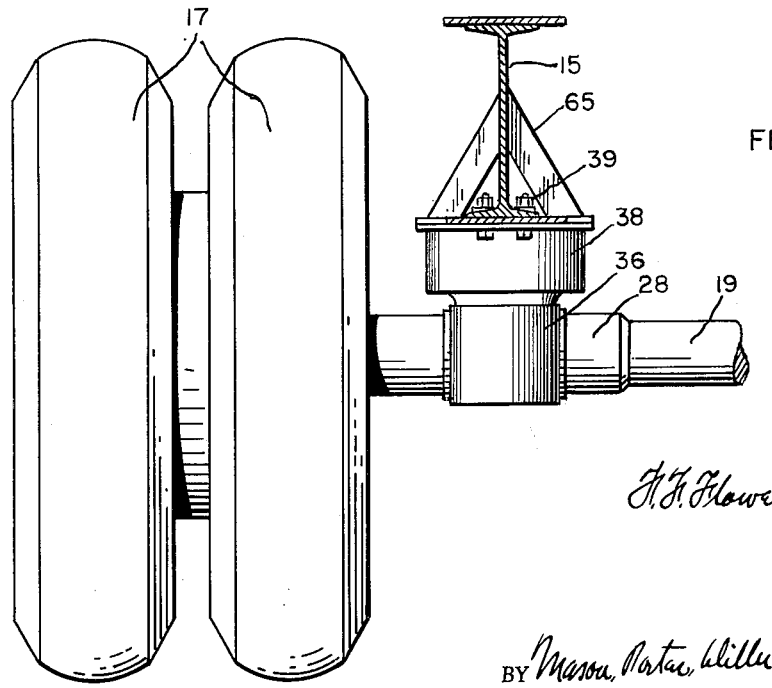
F.F.Flowers
INVENTOR
BY Mason, Porter, Diller & Stewart
ATTORNEYS

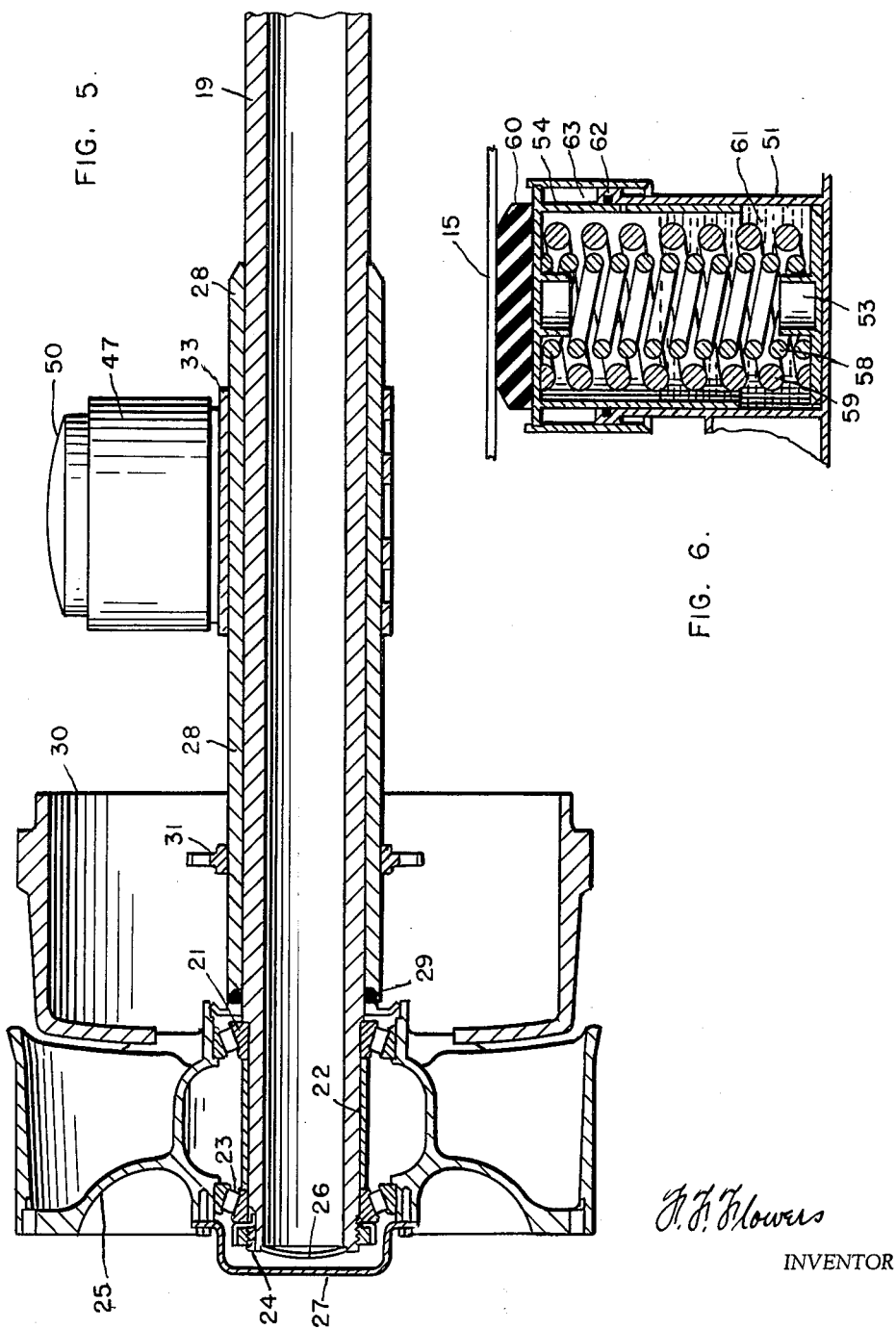

United States Patent Office 3,211,468
Patented Oct. 12, 1965

3,211,468
VEHICLE SUSPENSION MECHANISM
Fred Fort Flowers, % Differential Steel Car Co.,
Findlay, Ohio
Filed July 18, 1962, Ser. No. 210,767
12 Claims. (Cl. 280—124)

The specification which follows relates to an improved type of vehicle suspension mechanism primarily intended for rubber-tired road vehicles.

As indicating one use for which it is particularly adaptable, note is made of side dump trailers where stiffness or stability in roll or side tilting is required without sacrificing the desirable property of compliant longitudinal and vertical springing. The latter is peculiarly desirable for transport over rough roads.

Material improvement is obtained both as to reduction in weight and simplification of structure by utilizing the vehicle axles not only as load carrying members, and for resisting torque due to braking, but also as integral operating parts of the system stabilizing against lateral or transverse roll.

One of the objects of my invention is to provide a spring suspension for vehicles which has minimum weight when compared with the usual running gear.

A further object of the invention is effectively to stabilize in transverse rolling or side tilting, such as is especially found in the transport of high vehicles and in side dump vehicles where the center of gravity shifts to one side when the lading is discharged laterally.

A further object of the invention is as above indicated, the utilization of the vehicle axle as a compliant part of the roll stabilization system of the vehicle.

A related object of the invention is to provide means for increasing the compliance of a stabilizer against rolling by using concentric axles and load carrying tubes.

It is also an object of my invention to increase the torsional compliance of the axle as a roll stabilizer by utilizing the full length of the axle between the wheels as a factor in addition to the tubes connected to the torque arms or cranks.

As an incident to the invention there is also the purpose of increasing the compliance of a roll stabilization system by the use of rubber cushions at the points where the stabilizer crank is attached.

Among the objects of my invention is the reduction to a minimum in the number of wearing parts in the combined spring suspension and roll stabilization system.

Incidental to the objects of my invention is the provision of a combined spring suspension and roll stabilization system which is completely isolated by resilient cushions from the vehicle frame.

This combined suspension and stabilization is advantageously arranged to provide that the resilient springs are made of rubber or the like to cushion the shock when the metal springs have reached maximum compression.

A still further object of the invention is to provide a unitary structure in which the mechanical spring action is supplemented by the resilience of pneumatic action.

Other objects of the invention will be readily understood from the description of the preferred form as illustrated in the accompanying drawings in which:

FIG. 2 is a fragmentary plan view of the running gear with parts broken away;

FIG. 3 is an enlarged fragmentary front view of one axle mounting on the line 3—3 of FIGURE 2;

FIG. 5 is an enlarged transverse vertical section taken on the line 5—5 of FIG. 2; and FIG. 6 is an enlarged median section of a modified form of enclosed spring element.

Figure 1:
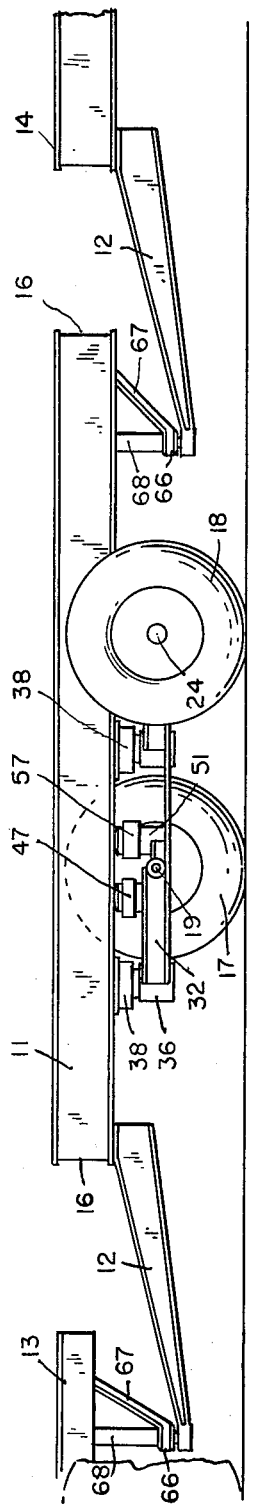
FIG. 1 is a side elevation with parts broken away, of the novel running gear of a trailer unit and connections with a following trailer and with the leading trailer.

By way of example the invention has been shown on the drawings in the form of a vehicle frame 11 forming part of one unit in an articulated train of road vehicles. It is connected by a tongue 12 to a vehicle 13 in front, which may be a tractor or other unit of the train. In like manner the vehicle frame 11 is connected to a following vehicle 14 having a similar tongue 12.

The relevant parts of the frame are the side members 15, 15 connected at each end by cross pieces 16, 16.

Each vehicle unit has its frame supported by front wheels 17, 17 and rear wheels 18, 18. The forward wheels 17, 17 support an axle 19, while the rear wheels 18 support a rear axle 20.

At each end the axle has an inner tapered roller bearing 21, a spacer 22 and an outer roller bearing 23. This constitutes a journal bearing which is held in place by means of the locknut 24.

A wheel 25 is thus mounted on the journal bearing at each end of each axle. The ends of the axles are closed with axle caps 26, while hub caps 27 are mounted on the wheels. Inwardly of the journal bearings, each axle carries a loosely fitted sleeve 28. This sleeve 28 is welded at its outer end near the journal bearing, as shown at 29 in FIG. 5.

A brake drum 30 is formed as part of the wheel 25.

Within the recess of the brake drum 30 a support ring 31 is fastened to the sleeve 28 on which the conventional brakes are mounted.

Figure 4:
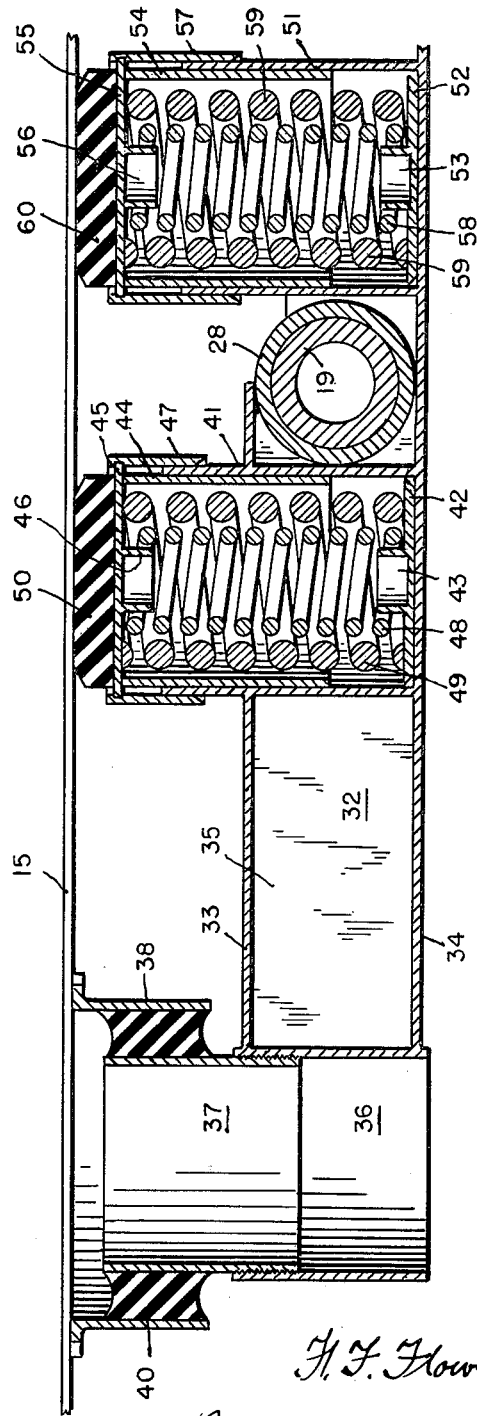
FIG. 4 is an enlarged longitudinal vertical section taken on the line 4—4 of FIG. 2.

An arm 32 in the form of a box frame is mounted on the sleeve 28. As shown in FIG. 4, the box frame consists of a top member 33, the rear end of which is welded or otherwise fastened to the free end of the sleeve 28. A bottom member 34 is fastened by welding or otherwise to the diametrically opposite point on the sleeve 28. The member 34 extends to the rear for a purpose which will later appear.

Vertical side members 35, 35 connect the top 33 and the bottom 34 and also extend forwardly from attachment to the sleeve 28.

The front of the box frame encloses a vertical bushing 36. A second vertical bushing 37 is screw-threaded or otherwise fixedly attached to bushing 36 from which it extends upwardly.

The side member 15 of the frame 11 has a depending bushing 38 bolted on by bolts 39. An intermediate ring 40 of rubber or other elastic material, is bonded to the opposing sides of the bushings 37 and 38. In this manner the frame 32 constitutes a torque tube directly for the sleeve 28 and indirectly for the axle 19.

A spring housing 41 is mounted in the arm 32 in advance of the sleeve 28. The housing 41 is suitably attached to the bottom 34 and sides 35, 35. The housing projects upwardly above the top 33 of the tube 32. This housing has a lower spring set plate 42 which has a round central guide 43.

An upper spring housing 44 is slidably fitted within the housing 41. A member 44 has a top spring seat plate 45 in which there is a depending central guide 46.

Surrounding the plate 45 is a depending collar 47. This is spaced from the upper housing 44 sufficiently to permit free sliding movement of the lower housing member 41.

The lower spring housing member 41 contains a relatively light coil spring 48 which is held in axial position by the collars 43 and 46. Surrounding the coil spring 48 is a heavier coil spring 49 which extends from spring 42 to spring plate 45.

An elastic cushion 50 is mounted upon the spring plate 45 and in turn supports the side member 15 of the frame 11.

The bottom member 34 of the arm is extended rearwardly beneath the sleeve 28 and forms a platform for supporting a rear lower spring housing 51. This is similar to housing 41. Housing 51 is attached at its sides by welding or the like to sides 35, 35 of the arm.

The lower outer housing 51 has a spring plate 52 with a central guide collar 53. A depending upper spring housing 54 slides vertically within member 51. Member 54 has an upper spring seat plate 55 with a central guide collar 56.

An outer collar 57 is mounted on the upper housing member 54 and allows space for the movement of the member 51. A relatively small coil spring 58 is held within the housing 51 and 54 and held centrally by the collars 53 and 56.

A relatively stronger coil spring 59 is fitted within the housing between the end seat plates 52 and 55.

A second elastic cushion 60 is seated on the upper spring housing 54 and in turn supports the side member 15 of the frame 11.

In FIG. 6 there is shown a modified form of the spring housings in which provision is made for a pneumatic cushion within the enclosure containing the springs. Here the lower spring housing 51 forms a receptacle for a liquid 61.

The upper end of the outer housing member 51 is enlarged to form a recess containing a sealing gasket 62, such as an O-ring or the equivalent.

The inner housing member 54 is thus sealed in contact with the outer housing member 51.

The inner housing member has a passageway 63 at an elevation where it will be above the sealing ring 62 when the housing member is lifted by the springs. This serves to admit air to replace any which may have been lost during operation. When abnormal weight on the side member 15 depresses the upper spring housing 54, passageway 63 is closed. The air contained above the liquid 61 is therefore subject to compression supplementing the action of the springs and the elastic cushion 60.

The rear spring units differ from the front ones primarily in providing a longer spring travel in the vertical direction.

Stiffening struts 65 as shown in FIG. 3 are used to hold the elements 38 rigid.

A trailer hitch 66 is provided beneath the rear of the vehicle unit. This is connected by struts 67 to the rear cross frame 16. The hitch is connected laterally to the sides of the vehicle frame by means of struts 68.

It will be evident from FIG. 2 that roll stabilization of the vehicle permits the frame to roll or rock while the axles 19 and 20 remain level. The rubber cushions 50, 60 on the high side will of course expand, while those on the low side of the vehicle are compressed downwardly. The movement is also translated to the springs in the elements 41 and 51. Those on the high side will be extended, while those on the low side will be compressed. The resulting opposing forces are transmitted from the elastic anchorage of member 36 through the box frame 32, which supports the springs, and to the sleeves 28 around the axle 19. Due to the limited freedom of movement of the sleeves 28 from their sole attachment to the axle 19 at the welded ends 29, the box frame 32 forms an efficient torque tube. The torsional effect is increased by virtue of the fact that substantially the full length of the axle between the wheels is between the outer welded ends of the sleeves 28.

It is understood that the rear axle 20 is equipped with the same resilient suspension as has been described for the front axle 19.

The rubber cushions 50 and 60 as well as the coil springs have sufficient resilience to accommodate the various angular displacements resulting from travel over rough ground in which the opposite ends of each axle are subject to different stresses and deflections.

Variation in the stiffness of the several springs permits shifting of portions of the vehicle weight relative to the cushions 50 and 60, thus relying in greater or less degree on the latter for vertical support.

Variation in the degree of stabilization is attained by variation in the elasticity and dimensions of the rubber cushions, variation in the length of the box frames 32 and variation in the lengths of the outer axle sleeves 28.

The construction and operation of the improved vehicle suspension has been illustrated by the above example. However, change in proportions of the several parts and the materials used provide for substantial variation to suit different operating conditions without, however, departing from the scope of the invention as defined in the following claims.

What I claim is:

1. In combination with a vehicle frame, suspension means comprising a tubular axle having a journal bearing at each opposite end, a pair of sleeves each loosely surrounding the axle with their outer ends fastened thereto inwardly of the journal bearing, a longitudinally extending arm attached to each sleeve at its opposite end, the front end of each said arm being elastically connected with the vehicle frame, a spring housing on each arm adjacent to the sleeve, and compression springs within the housing supporting the vehicle frame.

2. In combination with a vehicle frame, suspension means comprising a tubular axle having a journal bearing at each opposite end, a pair of sleeves each loosely surrounding the axle with their outer ends fastened thereto inwardly of the journal bearing, a longitudinally extending arm attached to each sleeve at its opposite end, a vertical bushing on the free end of the arm, a depending bushing on the vehicle frame around the vertical bushing, an elastic member bonded to both bushings, a spring housing on each arm adjacent to the sleeve, and compression springs within the housing supporting the vehicle frame.

3. In combination with a vehicle frame, suspension means comprising a tubular axle having a journal bearing at each opposite end, a pair of sleeves each loosely surrounding the axle with their outer ends fastened thereto inwardly of the journal bearing, a longitudinally extending arm attached to each sleeve at its opposite end, the front end of each said arm being elastically connected with the vehicle frame, a spring housing on each arm adjacent to the sleeve, and concentric coil springs within each housing supporting the vehicle frame.

4. In combination with a vehicle frame, suspension means comprising a tubular axle having a journal bearing at each opposite end, a pair of sleeves each loosely surrounding the axle with their outer ends fastened thereto inwardly of the journal bearing, a longitudinally extending arm attached to each sleeve at its opposite end, the front end of each said arm being elastically connected with the vehicle frame, lower housing members mounted on the arms adjacent to the axle, upper housing members slidably fitted within the lower housing members, concentric coil springs in the housing members and elastic cushions on the upper housing members supporting the vehicle frame.

5. In combination with a vehicle frame, suspension means comprising a tubular axle having a journal bearing at each opposite end, a pair of sleeves each loosely surrounding the axle with their outer ends fastened thereto inwardly of the journal bearing, a longitudinally extending arm attached to each sleeve at its opposite end, the front end of each said arm being elastically connected with the vehicle frame, lower housing members mounted on the arms adjacent to the axle, upper housing members slidably fitted within the lower housing members, collars on the upper housing members slidably fitted around the lower housing members, compression springs in the housing members and elastic cushions on the upper housing members supporting the vehicle frame.

6. In combination with a vehicle frame, suspension means comprising a tubular axle having a journal bearing at each opposite end, a pair of sleeves each loosely surrounding the axle with their outer ends fastened thereto inwardly of the journal bearing, a longitudinally extending arm attached to each sleeve at its inner end, the front end of each said arm being elastically connected with the vehicle frame, liquid-tight lower housing members mounted on the arms adjacent to the axle, upper housing members slidably fitted within the lower housing members, liquid-tight sealing means held between each pair of housing members, an air inlet in each upper housing member, compression springs in each pair of housing members and elastic cushions on the upper housing members supporting the vehicle frame.

7. In combination with a vehicle frame, suspension means comprising a tubular axle having a journal bearing at each opposite end, a pair of sleeves each loosely surrounding the axle with their outer ends fastened thereto inwardly of the journal bearing, a forwardly extending arm attached to each sleeve at its opposite end, the front end of each said arm being elastically connected with the vehicle frame, a two-part front spring housing on each arm in advance of the sleeve, a two-part rear spring housing on the arm in rear of the sleeve, compression springs within each housing and elastic cushions on the housing supporting the vehicle frame.

8. In combination with a vehicle frame, suspension means comprising a tubular axle having a journal bearing at each opposite end, a pair of sleeves each loosely surrounding the axle with their outer ends fastened thereto inwardly of the journal bearing, a forwardly extending arm attached to each sleeve at its opposite end, a vertical bushing on the free end of the arm, a depending bushing on the vehicle frame around the vertical bushing, an elastic member bonded to both bushings, a front spring housing on each arm in advance of the sleeve, a rear spring housing on each arm in rear of the sleeve, compression springs within the housing and elastic cushions on the housings supporting the vehicle frame.

9. In combination with a vehicle frame, suspension means comprising a tubular axle having a journal bearing at each opposite end, a pair of sleeves each loosely surrounding the axle with their outer ends fastened thereto inwardly of the journal bearing, a forwardly extending arm attached to each sleeve at its opposite end, the front end of each said arm being elastically connected with the vehicle frame, a two-part front spring housing on each arm in advance of the sleeve, a two-part rear spring housing on the arm in the rear of the sleeve, concentric coil springs within each housing and elastic cushions on the housings supporting the vehicle frame.

10. In combination with a vehicle frame, suspension means comprising a tubular axle having a journal bearing at each opposite end, a pair of sleeves each loosely surrounding the axle with their outer ends fastened thereto inwardly of the journal bearing, a forwardly extending arm attached to each sleeve at its opposite end, the front end of each said arm being elastically connected with the vehicle frame, lower housing members mounted on the arms in advance of the axle, other lower housing members mounted on the arms in rear of the axle, upper housing members slidably fitted within the lower housing members, concentric coil springs in the pairs of housing members and elastic cushions on the upper housing members supporting the vehicle frame.

11. In combination with a vehicle frame, suspension means comprising a tubular axle having a journal bearing at each opposite end, a pair of sleeves each loosely surrounding the axle with their outer ends fastened thereto inwardly of the journal bearing, a forwardly extending arm attached to each sleeve at its opposite end, the front end of each said arm being elastically connected with the vehicle frame, lower housing members mounted on the arms in advance of the axle, other housing members mounted on the arms in rear of the axle, upper housing members slidably fitted within the lower housing members, collars on the upper housing members slidably fitted around the lower housing members, compression springs in the pairs of housing members and elastic cushions on the upper housing members supporting the vehicle frame.

12. In combination with a vehicle frame, suspension means comprising a tubular axle having a journal bearing at each opposite end, a pair of sleeves each loosely surrounding the axle with their outer ends fastened thereto inwardly of the journal bearing, a forwardly extending arm attached to each sleeve at its opposite end, the front end of each said arm being elastically connected with the vehicle frame, liquid-tight lower housing members mounted on the arms in advance of the axle, other liquid-tight lower housing members mounted on the arms in rear of the axle, upper housing members slidably fitted within the lower housing members, liquid-tight sealing means held between each pair of housing members, an air inlet in each upper housing member, compression springs in each pair of housing members and elastic cushions on the upper housing members supporting the vehicle frame.

References Cited by the Examiner
UNITED STATES PATENTS

| | | | |
|---|---|---|---|
| 2,030,263 | 2/36 | Mercer | 280—124 |
| 2,480,934 | 9/49 | Julien | 267—57 |
| 2,692,770 | 10/54 | Nallinger | 267—20 |
| 2,816,776 | 12/57 | Nimtz | 280—106.5 X |
| 2,980,439 | 4/61 | Miller | 280—104.5 |

FOREIGN PATENTS

| | | |
|---|---|---|
| 575,389 | 2/46 | Great Britain. |
| 1,093,219 | 11/60 | Germany. |

A. HARRY LEVY, *Primary Examiner.*

LEO FRIAGLIA, *Examiner.*